US008268608B2

(12) United States Patent
Matano et al.

(10) Patent No.: US 8,268,608 B2
(45) Date of Patent: Sep. 18, 2012

(54) METHOD OF TREATING BIOMASS, COMPOST, MULCHING MATERIAL FOR LIVESTOCK AND AGENT FOR TREATING BIOMASS

(75) Inventors: Yutaka Matano, Nagoya (JP); Ikuko Sugiyama, Nagoya (JP); Shiori Emoto, Nagoya (JP); Chikako Nakamura, Nagoya (JP); Ikuo Fukumura, Obu (JP); Masashi Takahashi, Toyota (JP)

(73) Assignees: Menicon Co., Ltd., Nagoya-shi (JP); Toyota Jidosha Kabushiki Kaisha, Toyota-shi (JP)

( * ) Notice: Subject to any disclaimer, the term of this patent is extended or adjusted under 35 U.S.C. 154(b) by 726 days.

(21) Appl. No.: 12/295,614

(22) PCT Filed: Mar. 30, 2007

(86) PCT No.: PCT/JP2007/057055
§ 371 (c)(1),
(2), (4) Date: Sep. 30, 2008

(87) PCT Pub. No.: WO2007/114324
PCT Pub. Date: Oct. 11, 2007

(65) Prior Publication Data
US 2009/0241623 A1    Oct. 1, 2009

(30) Foreign Application Priority Data

Mar. 31, 2006   (JP) ................................. 2006 099748

(51) Int. Cl.
*C05F 11/08* (2006.01)
*C12N 1/20* (2006.01)
*A62D 3/02* (2007.01)

(52) U.S. Cl. ................. 435/252.5; 71/8; 71/9; 435/262; 435/262.5; 435/268

(58) Field of Classification Search .................. 71/6–10; 435/262.5, 262, 268, 252.5; 119/171
See application file for complete search history.

(56) References Cited

U.S. PATENT DOCUMENTS

| 2,260,201 | A | * | 10/1941 | Stoller | .............................. 47/1.1 |
| 5,364,788 | A | | 11/1994 | Kubo | |
| 5,733,355 | A | * | 3/1998 | Hibino et al. | ....................... 71/6 |
| 6,025,187 | A | * | 2/2000 | Penaud | ....................... 435/262.5 |
| 6,569,332 | B2 | * | 5/2003 | Ainsworth et al. | ........... 210/603 |
| 7,371,556 | B2 | * | 5/2008 | Oshima | ....................... 435/252.1 |
| 2004/0250580 | A1 | * | 12/2004 | Majima | ........................... 71/10 |
| 2006/0024789 | A1 | | 2/2006 | Rahman et al. | |
| 2006/0130545 | A1 | * | 6/2006 | Miyazaki et al. | ................... 71/6 |

(Continued)

FOREIGN PATENT DOCUMENTS

JP   07-163336 A   6/1995

(Continued)

*Primary Examiner* — Wayne Langel
(74) *Attorney, Agent, or Firm* — Sughrue Mion, PLLC

(57) ABSTRACT

The present invention provides a method of treating biomass that reduces water-polluting substances, suppresses the production of malodorous gases and greenhouse gases, decreases the nitrogen content in the compost or livestock bedding thus prepared, and furthermore, easily treats nitrogen-containing biomass in a short time at high temperature. The present invention also provides compost and livestock bedding produced by the method and a biomass treating agent. The method of treating biomass includes blending, with nitrogen-containing biomass, a *Geobacillus* microorganism having denitrification capability and a fermentation promoter that promotes the fermentation of the nitrogen-containing biomass by the *Geobacillus* microorganism.

11 Claims, 2 Drawing Sheets

U.S. PATENT DOCUMENTS

2009/0014384 A1* 1/2009 Akashi et al. .............. 210/606
2009/0148881 A1* 6/2009 Wang et al. ................. 435/29

FOREIGN PATENT DOCUMENTS

| | | |
|---|---|---|
| JP | 08-157285 A | 6/1996 |
| JP | 2553727 B2 | 8/1996 |
| JP | 11-292674 A | 10/1999 |
| JP | 2000-197478 A | 7/2000 |
| JP | 2001-086981 A | 4/2001 |
| JP | 2001-179222 A | 7/2001 |
| JP | 2003-160390 A | 6/2003 |
| JP | 2003-221288 A | 8/2003 |
| JP | 2005-073639 A | 3/2005 |
| JP | 2005-130820 A | 5/2005 |
| JP | 2005-349258 A | 12/2005 |
| JP | 2006-042820 A | 2/2006 |
| JP | 2006-238794 A | 9/2006 |
| KR | 100176991 B1 | 11/1998 |
| KR | 100546991 B1 | 1/2006 |

* cited by examiner

Temperature changes at 50cm depth from the surface

Temperature changes at 20cm depth from the surface

METHOD OF TREATING BIOMASS, COMPOST, MULCHING MATERIAL FOR LIVESTOCK AND AGENT FOR TREATING BIOMASS

FIELD OF INVENTION

The present invention relates to a method of treating biomass, compost and livestock bedding produced by the method, and a biomass treating agent. To be more specific, the present invention relates to a method of treating biomass wherein it is possible to raise the temperature of a nitrogen-containing biomass while its nitrate nitrogen is decreased, and the production of greenhouse gases is suppressed; compost and livestock bedding produced by the method; and a biomass treating agent.

BACKGROUND OF THE INVENTION

Biomass, such as livestock manure and excess sewage sludge is generally known as a material comprising organic resources originating from living organisms. Excess sewage sludge is the sludge obtained after biological treatment of nitrogen-containing organic waste that is discharged as sewage from homes for instance. Biomass is drawing attention because, unlike fossil resources like petroleum, it is reusable, as resources, such as compost or energy, without increasing the atmospheric carbon dioxide. However, in most cases, waste originating from living organisms cannot be used as is as biomass, and needs to be given specific treatments. For example, nitrogen-containing wastes like livestock manure and excess sewage sludge cannot be discarded as such or reused as compost for instance. The nitrogen-containing waste needs treatment for removal of malodorous components like ammonia, for reduction of its water content. For example, in methods of microbial decomposition and fermentation treatment of organic wastes, in which the waste is simply left as such, malodorous components such as fatty acids and amines are produced further. Therefore, treatment to reduce the bad odor of the organic waste is essential. In decomposition and fermentation methods, which allow the natural course of events to occur, such as leaving the waste under conditions where multiple types of microbes coexist, have problems such as instability and non-reproducibility of the decomposition treatment.

Conventionally, organic materials such as sawdust are mixed with livestock manure for reducing the water content, such as from urine, in the manure, as a method of absorbing and dispersing the moisture in the manure into the organic material. The carbon component of the livestock manure is present only in the form of dietary fibers, which are digestion residues of the livestock, and the aforesaid organic material, and very little of the carbon component in the livestock manure is in forms usable by microorganisms. Nitrogen components like proteins are in excess in the livestock manure, which results in the production and accumulation of ammonia, making the pH of the manure alkaline. The release of a proton from the ammonium ion in the livestock manure gives rise to ammonia gas, which is then dispersed into the atmosphere as a malodorous substance. These are the major problems in the early methods of composting.

The method of adding a microbial material and a carbon component such as a sugar or an organic acid to the material to be treated, as described in Patent Documents 1 to 3, is known as means of solving the aforementioned problems. Known commercially available carbon components of the aforesaid type include Fieldcompo, Cattlecompo, Caloriecompo, Accelcompo, and Assistcompo from Nisshin Flour Milling Inc. At the actual site of the composting treatment, wood vinegar is added, a carbon component is added for accelerating the fermentation, and a commercially available deodorant is used.

However, the decomposition reaction of the material to be treated by the aforesaid microbial material is an oxidative decomposition reaction. Therefore, when substances that can be easily assimilated by the microorganism, such as organic acids and sugars, are present in the material to be treated, the oxygen in the material to be treated is rapidly consumed through respiration by the microorganism. As a result, the inside of material to be treated becomes oxygen-poor (anaerobic), and organic acid accumulates in the process of sugar metabolism, and this lowers the pH of the material to be treated. Thus, although it is possible to prevent the emanation of ammonia odor from the material to be treated, methane gas, a known greenhouse gas, is produced, and odors other than of ammonia arising from the dispersal of low molecular weight organic acids are produced. Also, a long time is needed for the complete curing of the material to be treated because of the anaerobic fermentation. Moreover, attempts made to lower the water content of the material to be treated only by blending organic materials increase the bulk of the material to be treated, and this increases the time required to compost it.

There have also been attempts to solve the aforesaid problems by adding not only carbohydrates, but also oils produced as food waste, for instance, to the material to be treated. But there are some concerns about this method, including the lack of oxygen arising from poor aeration when the compost becomes more fluid, and the damage to germination of crop plants from the undecomposed oils in the compost thus prepared.

The methods of treating with the specific microorganisms described in Patent Documents 4 to 6 are known as biological methods of treating the malodorous gases like ammonia and amines produced during the fermentation of organic wastes. Patent Document 4 discloses a method of blending *Bacillus badius* with livestock feces to reduce malodorous substances such as ammonia through assimilation. Patent Document 5 discloses a method of reducing odor and water content of the organic raw material by blending hyperthermophilic bacteria of the genera *Bacillus, Micrococcus*, etc with organic raw materials like livestock feces and sewage sludge, and fermenting the organic raw material while aerating it. Patent Document 6 discloses a method of preventing the generation of odor by assimilation of malodorous compounds such as ammonia by using microorganisms like *Bacillus smithii*. Apart from the aforesaid methods of preventing the generation of odor by the assimilation of ammonia, etc, the method of preventing odor generation by nitrification and denitrification using microorganisms is also known. In this method, ammonium ions, nitrite ions, and nitrate ions are removed as nitrogen by the actions of nitrifying bacteria (ammonia oxidizing bacteria and nitrite oxidizing bacteria) and denitrifying bacteria.

Patent Document 1: U.S. Pat. No. 5,364,788

Patent Document 2: Japanese Patent No. 2553727

Patent Document 3: Japanese Laid-Open Patent Publication No. 2000-197478

Patent Document 4: Japanese Laid-Open Patent Publication No. 07-163336

Patent Document 5: Japanese Laid-Open Patent Publication No. 11-292674

Patent Document 6: Japanese Laid-Open Patent Publication No. 2005-130820

SUMMARY OF THE INVENTION

In the method of treatment disclosed in Patent Document 4, however, the growth temperature of *Bacillus badius* used for consuming the malodorous substances like ammonia is around 25 to 38° C. Therefore, it requires the additional steps of sterilization, decomposition, etc, if the deodorization-treated livestock feces are to be discarded or reused as biomass. Moreover, the method has the problem of production of greenhouse gases such as methane gas and nitrous oxide in the process of deodorization through the assimilation of ammonia, etc.

In the method disclosed in Patent Document 5, the removal of water and the decomposition treatment are done simultaneously by fermentation at around 100° C. Therefore it is not easy to balance the advancement of biomass decomposition by microorganisms and maintenance of optimum moisture content for the microorganisms. Besides this, irrespective of which method mentioned above is used, the nitrate nitrogen cannot be decreased sufficiently in the material treated by the above-mentioned microorganisms for its use as compost. Nitrate nitrogen is a water-pollutant, can cause the problem of eutrophication of closed water areas, and is also believed to contaminate ground water if present at high concentration in the treated material.

The method of treatment disclosed in Reference 6 has the problem of production of methane gas and nitrous oxide in the course of treatment by assimilation of ammonia, etc. The known method of preventing the generation of odor by nitrification and denitrification has the disadvantage of requiring at least two types of nitrifying bacteria and one type of denitrifying bacterium, i.e., a total of three types of microorganisms, and two treatment tanks (one tank for the anaerobic treatment and the other for the aerobic treatment). It also has the problem of requiring a long treatment time because of the very slow growth of nitrifying bacteria.

The present invention is based on the finding, made after painstaking investigations by the inventors, that the use of a *Geobacillus* microorganism as the microorganism that can treat nitrogen-containing biomass overcomes the aforesaid problems. The objective of the present invention is to provide a method of treating biomass that reduces water-polluting substances, suppresses the production of malodorous gases and greenhouse gases, decreases the nitrogen content in the finished compost or livestock bedding thus prepared, and furthermore, easily treats nitrogen-containing biomass in a short time at a high temperature. Another objective of the present invention is to provide compost and livestock bedding prepared using the aforesaid method of treatment, and a biomass treating agent.

One aspect of the present invention provides a method of treating biomass, including blending, with nitrogen-containing biomass, a microorganism of the genus *Geobacillus* having denitrification capability and a fermentation promoter that promotes fermentation of the nitrogen-containing biomass by the *Geobacillus* microorganism.

Another aspect of the present invention provides compost produced by the method of treating biomass.

Still another aspect of the present invention provides livestock bedding produced by the method of treating biomass.

Still another aspect of the present invention provides a biomass treating agent, which is used for treating nitrogen-containing biomass, and contains a *Geobacillus* microorganism having denitrification capability and a fermentation promoter that promotes the fermentation of the nitrogen-containing biomass by the *Geobacillus* microorganism.

BRIEF DESCRIPTION OF THE DRAWINGS

FIG. 1(*b*) is a graph showing temperature changes with time at 20 cm depth from the surface of the compost.

DETAILED DESCRIPTION OF THE PREFERRED EMBODIMENTS

Figure 1:
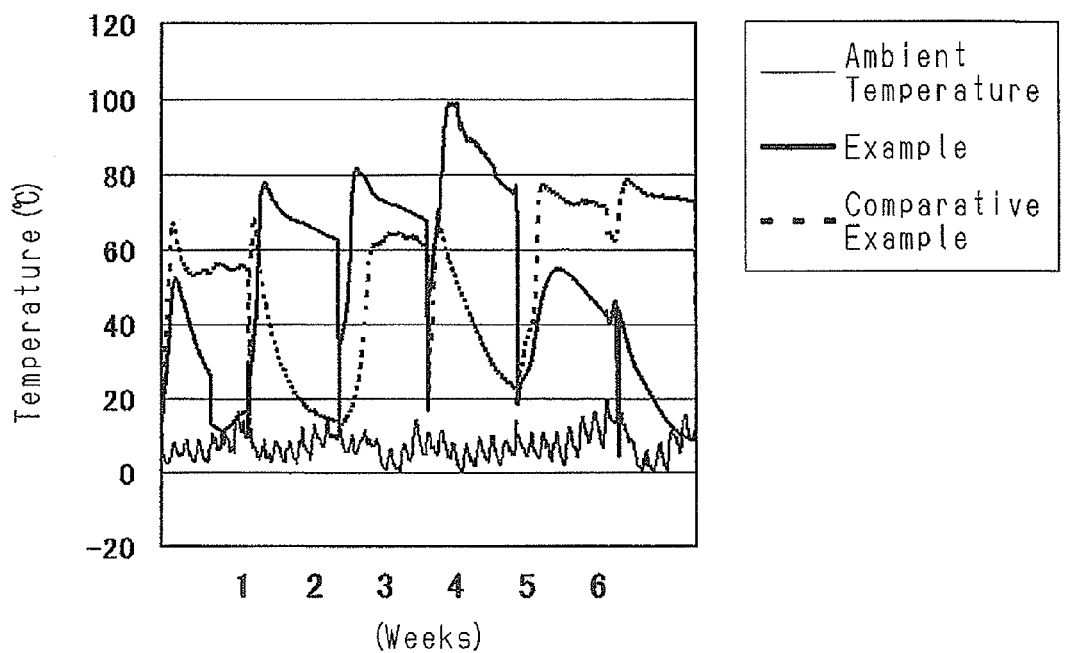
FIG. 1(*a*) is a graph showing temperature changes with time at 50 cm depth from the surface of the compost.
Figure 1:
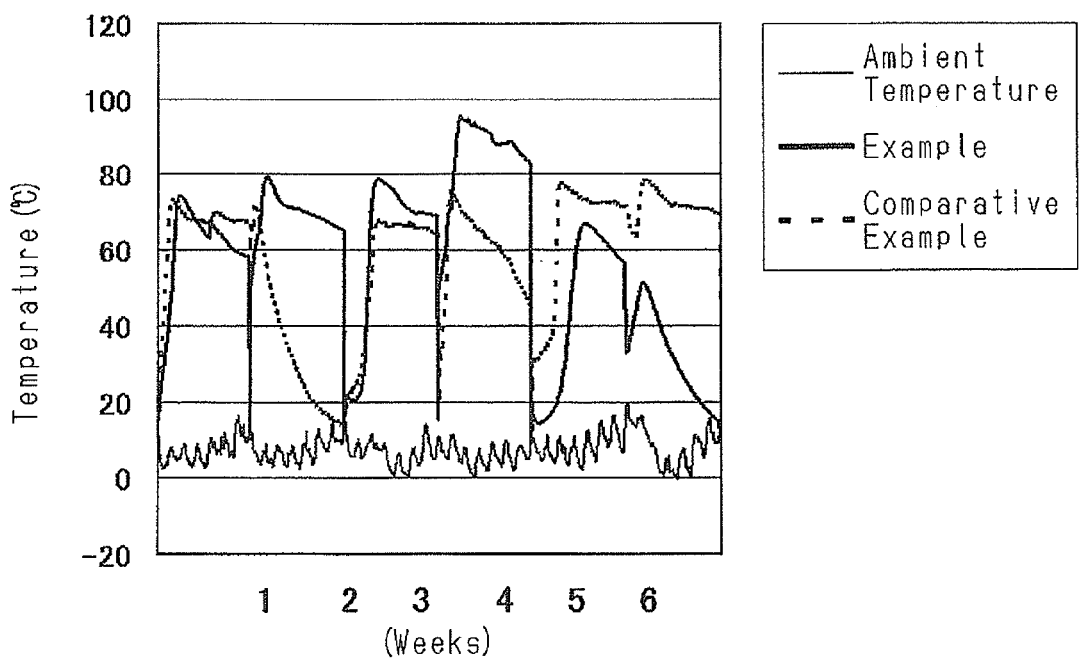

Compost and livestock bedding produced by a method of treating biomass according to one embodiment of the present invention will now be described.

The method of treating biomass according to the present embodiment includes a step of blending, with nitrogen-containing biomass, a *Geobacillus* microorganism having denitrification capability, and a fermentation promoter that promotes the growth of the microorganism and fermentation of the nitrogen-containing biomass by the microorganism. In this blending step, the nitrogen-containing biomass is ultimately converted into compost. The type of nitrogen-containing biomass that can be used in the present embodiment is not particularly limited, as long as it contains nitrogen, and specific examples include livestock manure (feces and urine) of cattle, swine, sheep, horses, poultry, etc; sewage sludge; and food wastes such as kitchen garbage, etc.

*Geobacillus* microorganisms are usually Gram stain positive, spore-forming, facultative anaerobic bacteria. The *Geobacillus* microorganism used in this embodiment further has denitrification capability, ammonia assimilation capability, and nitrate nitrogen assimilation capability. A bacterium with an optimum growth temperature in the high temperature range of 50 to 70° C. and an optimum pH for growth around the neutral pH of 6 to 8 is preferable as the *Geobacillus* microorganism. A bacterium having denitrification capability reduces nitrite or nitrate finally to nitrogen ($N_2$), via nitrogen monoxide for instance.

Examples of the *Geobacillus* microorganism of this embodiment include *Geobacillus thermodenitrificans*, *Geobacillus stearothermophilus*, *Geobacillus kaustophilus*, *Geobacillus subterranens*, *Geobacillus thermoleovorans*, and *Geobacillus caldoxylosilyticas*. Among these, *Geobacillus thermodenitrificans*, which was deposited at the National Institute of Technology and Evaluation in Japan (an independent administrative institution), Patent Microorganisms Depositary on Dec. 26, 2005 with accession No. NITE BP-157, is preferable. The above-listed examples of *Geobacillus* microorganisms are known microorganisms. Microorganisms deposited and maintained in various culture collections of microorganisms or those isolated from natural sources by known screening methods may be used.

*Geobacillus* microorganisms are thermophilic bacteria. They start multiplying in nitrogen-containing biomass at around 50° C. or higher, and the heat of fermentation raises the temperature of the nitrogen-containing biomass to about 70° C. or higher. This high temperature of the heat of fermentation evaporates the excess moisture in the nitrogen-containing biomass and accelerates the breakdown of high molecular weight organic matter to low molecular weight substances. Moreover, the high temperature of the heat of fermentation suppresses the growth of nitrite bacteria and nitrate bacteria, which carry out nitrification, and methane-forming bacteria.

The *Geobacillus* microorganism of this embodiment not only decreases nitrate nitrogen by its denitrification capability, but also decreases ammonia nitrogen by its ammonia assimilating action, and suppresses the production of nitrate nitrogen by its inhibitory action on the growth of nitrifying bacteria in nitrogen-containing biomass. Nitrogen, phosphorus, and potassium are the three major plant nutrients. Nitrogen is taken up by plant bodies in form of nitrate nitrogen, and is used, for instance, in the synthesis of proteins. It is known that excessive nitrate nitrogen intake induces symptoms of oxygen deprivation in animals. Therefore, if nitrogen-containing biomass is to be supplied to the soil as compost, it is important to prevent nitrate nitrogen pollution caused by excess accumulation of nitrate nitrogen in the soil.

Normally, in the nitrification and denitrification action by microorganisms, ammonia nitrogen ($NH^{4+}$), nitrite nitrogen ($NO^{2-}$), and nitrate nitrogen ($NO^{3-}$) in nitrogen-containing biomass are released as nitrogen gas into the atmosphere by the action of ammonia oxidizing bacteria and nitrite oxidizing bacteria, which are the nitrifying bacteria, and by the action of denitrifying bacteria. In general, nitrification is done by chemoautotrophic bacteria (nitrifying bacteria) that grow under aerobic conditions and denitrification is done by denitrifying bacteria that grow under anaerobic conditions. Therefore, for composting through nitrification and denitrification, at least three types of microorganisms and two treatment tanks (one tank for the anaerobic treatment and the other for the aerobic treatment) are needed. Moreover, the processing method that uses nitrifying bacteria alone has the drawback of requiring a long time because of the very slow growth rate of the nitrifying bacteria.

In the present embodiment, the temperature of nitrogen-containing biomass rapidly rises to 50° C. or higher by the action of the fermentation promoter and the *Geobacillus* microorganism having denitrification capability. Therefore, the temperature and duration suitable for growth of nitrifying bacteria, which oxidize the ammonia nitrogen in the nitrogen-containing biomass, are not available. In other words, the activities of *Nitrosomonas* (optimum growth temperature 20 to 30° C.), which is an ammonia oxidizing bacteria that plays a role in the reaction (nitrification) that forms nitrate nitrogen from ammonia nitrogen, and *Nitrobacter* (optimum growth temperature 35 to 42° C.), a nitrite oxidizing bacterium, are suppressed. As a result, nitrate nitrogen is not formed from ammonia nitrogen, and accumulation of nitrite nitrogen and nitrate nitrogen, which are products of nitrification, does not occur.

Since the *Geobacillus* microorganism has ammonia assimilation capability (the ability to assimilate ammonia), ammonia nitrogen in nitrogen-containing biomass is used as a nutrient source for growth of the microorganism. It is thought that because of this, the production of ammonia gas, a malodorous compound that is a problem in the ordinary composting process, can be avoided. Further, nitrate nitrogen present in nitrogen-containing biomass is reduced to nitrogen gas ($N_2$) by the denitrifying capability of the *Geobacillus* microorganism under the anaerobic conditions created by the advancement of composting and the growth of the *Geobacillus* microorganism, and released into the atmosphere.

Here, the interior of the nitrogen-containing biomass has anaerobic conditions. But since the temperature of the nitrogen-containing biomass far exceeds the temperature at which methane-producing bacteria can multiply, methane gas, which is produced in ordinary composting of livestock feces, is not produced. The temperature at which methane-producing bacteria can multiply is, for instance, not more than 55° C. in the case of *Methanoculleus thermophilus*. Therefore, greenhouse gases such as methane, which are released in large amounts in ordinary composting, are not produced in the present embodiment. Through this mechanism, in the present embodiment, ammonia nitrogen and nitrate nitrogen in nitrogen-containing biomass are simultaneously removed.

To be more specific, dietary fibers (cellulose and hemicellulose) contained in feces are converted to di- to pentasaccharides such as cellooligosaccharides or xylooligosaccharides, which are usable by microorganisms, by the microorganism or cellulase and xylanase originating from the fermentation promoter discussed below. Through this process, the ratio of the carbon source usable by the microorganism over the nitrogen source present in excess (C/N ratio) is adjusted to a value that is easy for the microorganism to use. Also, the ammonia produced is promptly taken up by the bacterial cell, the ammonia concentration in the nitrogen-containing biomass is reduced, and the production of malodorous components is suppressed at the same time.

In addition to this, since the *Geobacillus* microorganism added to nitrogen-containing biomass is a spore-forming bacterium, the nitrogen component taken up into the bacterial cell ends up in the spores. Unlike in other bacteria, not much of the nitrogen component taken up into the bacterial cell is converted into ammonia after the bacteria die. Therefore, the ammonia concentration during composting is maintained at a low level, and the nitrification reactions by nitrite bacteria and nitrate bacteria do not advance. Thus, the nitrate nitrogen content in the finished compost is decreased. Moreover, the production of nitrous oxide, a known greenhouse gas produced under oxygen-poor conditions during the conversion of ammonia (hydroxyamine) to nitrite by nitrite bacteria, is also suppressed.

When a fermentation promoter is added to nitrogen-containing biomass, microorganisms such as mesophilic bacteria present from the beginning in the nitrogen-containing biomass start multiplying as the biomass degrades to low molecular weight substances, producing heat of fermentation. The preferable fermentation promoters are polysaccharide hydrolases, and organic materials.

Examples of polysaccharide hydrolases include cellulases, xylanase, and pectinase. As polysaccharide hydrolases, normally, exo-type hydrolases, which decompose the polysaccharide polymer from its end, and endo-type hydrolases, which decompose the polysaccharide polymer from the middle, are listed. Both types of polysaccharide hydrolases are applicable in the present embodiment. The activation temperature of polysaccharide hydrolases is 10° C. to 60° C., and preferably, 15° C. to 55° C.

Examples of organic materials include oil cake, rice bran, wheat bran, corn steep liquor, brown sugar, soybean oil cake, meat meal, dried blood, chicken meal, fish meal, dried bonito residue, pupae meal, spent yeast, and beer waste. Mesophilic bacteria start multiplying, feeding on such organic materials. The aforesaid specific examples of the fermentation promoters may be used singly or in combinations of two or more.

Mesophilic bacteria are normally abundant in the soil. Therefore, a suitable amount of soil may be blended with nitrogen-containing biomass to intermix the mesophilic bacteria with the nitrogen-containing biomass. The mesophilic bacteria of the present embodiment should preferably be bacteria that can at least multiply in the temperature range of 20° C. to 50° C. to raise the temperature of nitrogen-containing biomass from the normal temperature to an intermediate temperature range (about 50° C. or less). Examples of mesophilic bacteria include *Bacillus alvei, B. amylolyticus, B. azotofix-*

*ans*, *B. circulans*, *B. glucanolyticus*, *B. larvae*, *B. lautus*, *B. lentimorbus*, *B. macerans*, *B. macquariensis*, *B. pabuli*, *B. polymyxa*, *B. popilliae*, *B. psychrosaccharolyticus*, *B. pulvifaciens*, *B. thiaminolyticus*, *B. validus*, *B. alcalophilus*, *B. amyloliquefaciens*, *B. atrophaeus*, *B. carotarum*, *B. firmus*, *B. flexus*, *B. laterosporus*, *B. lentus*, *B. licheniformis*, *B. megaterium*, *B. mycoides*, *B. niacini*, *B. pantothenticus*, *B. pumilus*, *B. simplex*, *B. subtilis*, *B. thuringiensis*, and *B. sphaericus*.

In the present embodiment, it is preferable to blend peat with the nitrogen-containing biomass in the aforesaid blending step. Peat is formed by humification. In other words, it is formed by the degradation under anaerobic conditions, of accumulated dead aquatic plants, graminaceous plants, and mosses. Peat has a clod structure, and high contents of water, and humic acid liked by actinomycetes. Therefore, its addition to nitrogen-containing biomass has a favorable effect on the growth of actinomycetes.

Examples of actinomycetes include *Thermoactimyces*, which is a thermophilic bacterium, and *Streptomyces*, which is a mesophilic bacterium. Actinomycetes are known to have antagonistic effect against mold fungi that cause damping-off disease of tomato, eggplant, cucumber, *fusarium* disease of cucumber, and wilt disease of spinach, and pathogenic bacteria that cause wilt disease of tomato, eggplant, and strawberry, when used as a material with high population density of actinomycetes where the actinomycetes count is $1 \times 10^8$ CFU or more per gram of the material. Actinomycetes are also known to have antagonistic effect against plant parasitic nematodes that parasitize the roots of cucumber, tomato, melon, chrysanthemum, radish, spinach, etc, and cause nematode damage, i.e., root necrosis. Actinomycetes are also known to have the effect of reducing *fusarium* wilt of spinach. Therefore, the nitrogen-containing biomass that has been treated with the *Geobacillus* microorganism and containing actinomycetes is expected to have a pathogen suppressing effect.

Actinomycetes are normally abundant in the soil. Therefore, actinomycetes may be multiplied by adding a suitable amount of soil to nitrogen-containing biomass before the nitrogen-containing biomass is treated at high temperature with the *Geobacillus* microorganism. Quite a few actinomycetes are thermophilic bacteria, which favor a high temperature range. Therefore, the increase in temperature of the nitrogen-containing biomass by the action of the *Geobacillus* microorganism contributes to the growth of actinomycetes such as *Thermoactinomyces*. It is known that when compost containing such actinomycetes in large amounts is used as bedding in cowsheds, it reduces the incidence of mastitis of dairy cattle (see "*Gendai Nogyo*", p. 298, March 1993, Rural Culture Association, a Japanese Foundation).

There is no specific restriction on the water content of the nitrogen-containing biomass at the start of the fermentation, but the preferable range is 40 to 75% by mass, and more preferably 50 to 65% by mass. When the water content in the nitrogen-containing biomass is 40% by mass or less, there is the risk of mesophilic bacteria and the *Bacillus* microorganism not multiplying sufficiently. The water content of the nitrogen-containing biomass can be adjusted by adding water, or by adding sawdust or bark.

A porous material may be added to nitrogen-containing biomass to maintain the air permeability of the nitrogen-containing biomass. Examples of such porous materials include rice husk, buckwheat husk, and perlite.

The effects of the compost and the livestock bedding prepared using the method of treating nitrogen-containing biomass according to the present embodiment will be described below.

When, for example, the *Geobacillus* microorganism and cellulase as a fermentation promoter are blended with livestock manure as nitrogen-containing biomass, the manure is degraded by the following reactions (effects). Firstly, in the primary degradation, the polysaccharides, like cellulose, in the livestock manure get decomposed and degraded into low molecular weight substances by the cellulase. Along with this, microorganisms that feed on the now low molecular weight degraded cellulose (sugars) multiply. Along with this growth of microorganisms, the temperature of the nitrogen-containing biomass rises to the above-mentioned intermediate temperature range. Then, the thermophilic *Geobacillus* microorganism multiplies selectively utilizing the metabolic heat and fermentation heat generated by the mesophilic bacteria. As a result, the temperature of the livestock manure rises to about 45 to 50° C.

Aeration is done by stirring or using a blower, to actively mix air into the livestock manure to induce aerobic fermentation by the *Geobacillus* microorganism. Vigorous growth of the *Geobacillus* microorganism raises the temperature of the livestock manure to the high temperature zone (about 60° C. to 95° C.). Preferably, the aeration is repeated once or more, and more preferably, it is done continuously until the completion of the livestock manure treatment. Once the livestock manure reaches its highest temperature, the manure changes from the aerobic to the anaerobic condition because of the oxidation resulting from vigorous growth of, and metabolism by, the microorganism. As a result, the temperature of the livestock manure comes down gradually. Therefore, the livestock manure is turned over for aeration, preferably when its temperature comes down by 10 to 20° C. from the highest temperature.

The treatment in the high temperature range brings about, for instance, a reduction of moisture content, degradation of organic matter to low molecular weight substances, decomposition of malodorous compounds such as amines, suppression of the production of methane gas, etc, arising from aerobic fermentation, and conversion of the high molecular weight fibers and proteins into low molecular weight substances, in the livestock manure. Besides this, the growth of anaerobic putrefying bacteria such as *Clostridium* is suppressed, and coliform bacteria and pathogenic bacteria such as *Staphylococcus aureus*, known as a bacterium that causes mastitis in cattle, are killed. Plant seeds present in the livestock manure are also killed. The growth of thermophilic actinomycetes like *Thermoactinomyces*, which have antagonistic effect against pathogens, is promoted in the high temperature range. When the composting reaction in the livestock manure is completed, and its temperature comes down to around the intermediate to normal temperature zone, the growth of mesophilic actinomycetes such as *Streptomyces* gets promoted. Compost and livestock bedding prepared from livestock manure, and having increased actinomycetes population, are of very high value.

Composting of livestock manure usually gets completed in 30 to 45 days, though it depends on the amount of air supplied, ambient temperature, moisture content, etc. When the composting is complete, the temperature of the livestock manure comes down because the high molecular weight organic matter in the livestock manure has degraded into low molecular weight substances, and the moisture content has reduced. The compost produced by complete composting produces much less of polluted water, which is a problem with cattle manure composting, and malodorous components and the moisture content of the compost are very much reduced.

The present embodiment has the following advantages.

(1) A *Geobacillus* microorganism is used in the present embodiment for treating nitrogen-containing biomass. Therefore, the treatment gets completed in a shorter time (30 to 45 days in the present embodiment) compared to treatment methods using a conventional *Bacillus* microorganism.

(2) Malodorous compounds such as ammonia and amines are removed through assimilation or decomposition, which reduces the odor of nitrogen-containing biomass.

(3) Since the decomposition and fermentation are carried out using a microorganism, the treatment according to the present embodiment does not require complex equipment or large amounts of water, compared to physical or chemical treatment methods like combustion, purification, and adsorption. Besides, the treatment method according to the present embodiment does not generate much of substances that require secondary treatment, i.e., by-products, and reduces the consumption of energy such as fossil fuels.

(4) During the high temperature treatment, the temperature of nitrogen-containing biomass rises to 70° C. or more, which treats unnecessary components of compost such as residual plant seeds and *Escherichia coli*.

(5) In the high temperature treatment using a *Geobacillus* microorganism, the temperature of nitrogen-containing biomass increases to 60 to 95° C. Since the nitrogen-containing biomass is treated at a temperature comparatively lower than when using hyperthermophilic bacteria, where the temperature reaches as high as 100° C., the advancement of decomposition and the moisture content of the nitrogen-containing biomass are easily balanced.

(6) In the present embodiment, the treatment for decomposing malodorous compounds, the treatment for killing unnecessary microorganisms such as pathogens, and the treatment for the evaporation of excess moisture are done simultaneously in one step, using a *Geobacillus* microorganism. Therefore, nitrogen-containing biomass is treated easily in a short time without requiring multi-stage processing.

(7) In the present embodiment, the nitrate nitrogen, which is believed to induce eutrophication of closed water areas when present in high concentration, and cause ground water pollution, is reduced in the compost through its chemical reduction and the suppression of its formation.

(8) The amounts of methane gas and nitrous oxide, which are greenhouse gases, produced during the treatment process by the decomposition and degradation of components in nitrogen-containing biomass to lower molecular weight substances, are reduced. *Geobacillus* microorganisms do not produce methane gas or nitrous oxide from nitrogen-containing biomass during high temperature treatment.

(9) When nitrogen-containing biomass treated with a *Geobacillus* microorganism is applied as compost to a field, the runoff of the nitrogen-containing biomass as compost-mixed water (compost leachate) by rainwater is suppressed.

(10) In the present embodiment, the high temperature treatment of nitrogen-containing biomass is done using a *Geobacillus* microorganism. Because of this, the growth of thermophilic actinomycetes such as *Thermoactinomyces* is promoted in the high temperature range.

The above-described embodiment may be modified as described below.

In the above-described embodiment, the method of treating nitrogen-containing biomass using a *Geobacillus* microorganism is used as a method of producing compost and livestock bedding. However, the method of treatment used in this embodiment may also be used for treating wastes like livestock manure, sewage sludge, etc, which can harm the environment if discarded as such, to convert them into treated substances that have no harmful effect on the environment. This makes suitable disposal of the treated substances easy. Apart from the application in the above-described embodiment, the *Geobacillus* microorganism may be used, for instance, for disinfection or germicidal treatment of soil, taking advantage of the high temperature treatment.

Nitrogen-containing biomass may be treated with a biomass treating agent containing the *Geobacillus* microorganism and a fermentation promoter. In such cases also nitrogen-containing biomass is treated at high temperature to achieve advantages similar to those seen in the aforesaid embodiment.

EXAMPLES

Next, the above embodiment will be described more specifically, citing some Examples and Comparative Examples.
<Isolation and Identification of Microorganisms>

The fully matured compost samples prepared from cattle feces, collected from various sites, were placed in test tubes containing water or physiological saline, and vigorously stirred with a mixer to elute the microorganisms contained in them. A part of this eluate was added to Schaeffer's sporulation medium (0.8% nutrient broth (Difco), 27 mM KCl, 2 mM $MgSO_4.7H_2O$, 1 mM $Ca(NO_3)_2.4H_2O$, 0.1 mM $MnCl_2.4H_2O$, and 1 μM $FeSO_4.7H_2O$) and cultured at 65° C. for 6 hours. The culture was heated for 5 minutes at 100° C. to kill off the vegetative cells that had not reached the stage of sporulation. The spore-forming bacteria alone were smeared on a flat agar medium containing components of growth medium for microorganisms, and cultured at 65° C. to form colonies. The thermophilic spore-forming bacteria were isolated by this method.

A medium comprising 10 g tryptone (Difco), 2 g potassium nitrate as the nitrate, and 1 L purified water (pH 7.5) was inoculated with the colonies of different seed bacteria, and anaerobically cultured for 12 hours at 65° C. The nitrate concentration was then determined quantitatively by a calorimetric method (Roche, Cat. No. 1 746 081), and the total nitrogen content analyzed by the Kjeldahl method. A thermophilic microorganism capable of nitrate nitrogen assimilation and denitrification was selected by measuring the nitrate concentration and the total nitrogen content before and after the culturing.

Identification of the bacterial strain isolated from the natural source in this Example showed that the strain was *Geobacillus thermodenitrificans*. This isolated and identified *Geobacillus thermodenitrificans* was then deposited at the National Institute of Technology and Evaluation (an independent administrative institution), Patent Microorganisms Depositary (Accession No. NITE BP-157, accepted on Dec. 26, 2005). This deposited *Geobacillus thermodenitrificans* was used hereinafter in this Example. The findings on growth characteristics, and the biochemical findings on *Geobacillus thermodenitrificans* (Accession No. NITE BP-157) are given below.

Cell width: 0.5 to 1.0 μm
Cell length: 1.5 to 2.5 μm
DNA GC content: 51.8 mol %
Motility: −
Growth at 45° C.: +
Growth at 70° C.: +
Growth at pH 9.0: +
Denitrification: +
Growth under anaerobic condition: +

Casein hydrolysis: +
Starch hydrolysis: +
Utilization
    Rhamnose: −
    Cellobios: +
    Galactose: +
    Xylose: +
    Ribose: +
    Arabinose: +
    Citric acid: +
Phenol resistance: 20 mM
<Composting Treatment>

Using livestock manure (feces of fattening cattle) as nitrogen-containing biomass, composting treatment was carried out according to Example 1 and Comparative Example 1. The temperature and the extent of bacterial growth inside the nitrogen-containing biomass, concentration of malodorous gases, concentration of greenhouse gases, and the maturity of the compost were measured at weekly intervals. Besides this, the compost components were also analyzed at weekly intervals. 10 $m^3$ of seed bacteria was added to total 50 $m^3$ of fattening cattle manure and sawdust used as a moisture adjusting material. In Example 1, a fermentation promoter containing cellulase derived from *Cellulomonas* sp. K32A was further added before starting the treatment. In Example 1, *Geobacillus thermodenitrificans* (Accession No. NITE BP-157) was used as seed bacteria. Seed bacteria for preparing the "return compost", mainly containing *Canocytophaga* sp. (Toyohashi Feed Mills Co., Ltd, see (5) of FIG. 2), were used as seed bacteria in Comparative Example 1.

<Temperature Change>

FIG. 1(*a*) shows changes in temperature with time, at 50 cm depth from the surface of the livestock manure (compost), and FIG. 1(*b*) shows changes in temperature with time, at 20 cm depth from the surface. The sharp vertical dips in temperature seen in the graphs of FIG. 1(*a*) and FIG. 1(*b*) occurred when the thermometers were taken out of the compost for stirring the compost for aeration.

The results shown in FIG. 1(*a*) and FIG. 1(*b*) suggest that in Example 1, the fermentation temperature of the compost started to decrease gradually at around the fifth week from the start of the treatment. In other words, it was discovered that the low molecular weight organic matter needed for fermentation began to exhaust in about one to one and a half months from the start of the treatment, the fermentation nearing its completion. In Example 1, a further decline in the fermentation temperature was observed 6 weeks from the start of the treatment. From this it was assumed that low molecular weight organic matter, the target substance for microbial decomposition, was exhausted and the compost became fully matured. In Comparative Example 1, the reaction temperature did not decrease for about 6 weeks from the start of the treatment.

<Growth of Bacterial Cells (DGGE Analysis)>

Change in microflora with time in the course of treatment of nitrogen-containing biomass in the aforesaid Example 1 and Comparative Example 1 was measured and evaluated by the Denaturing Gradient Gel Electrophoresis (DGGE). In DGGE, a gel containing a concentration gradient of a DNA denaturing agent such as urea is used for electrophoresis and DNA is separated exploiting the species specific GC ratio and AT ratio. The DNA bands obtained in the electrophoresis were subjected to base analysis to identify the bacterial species of the strain to which each band belongs.

Figure 2:
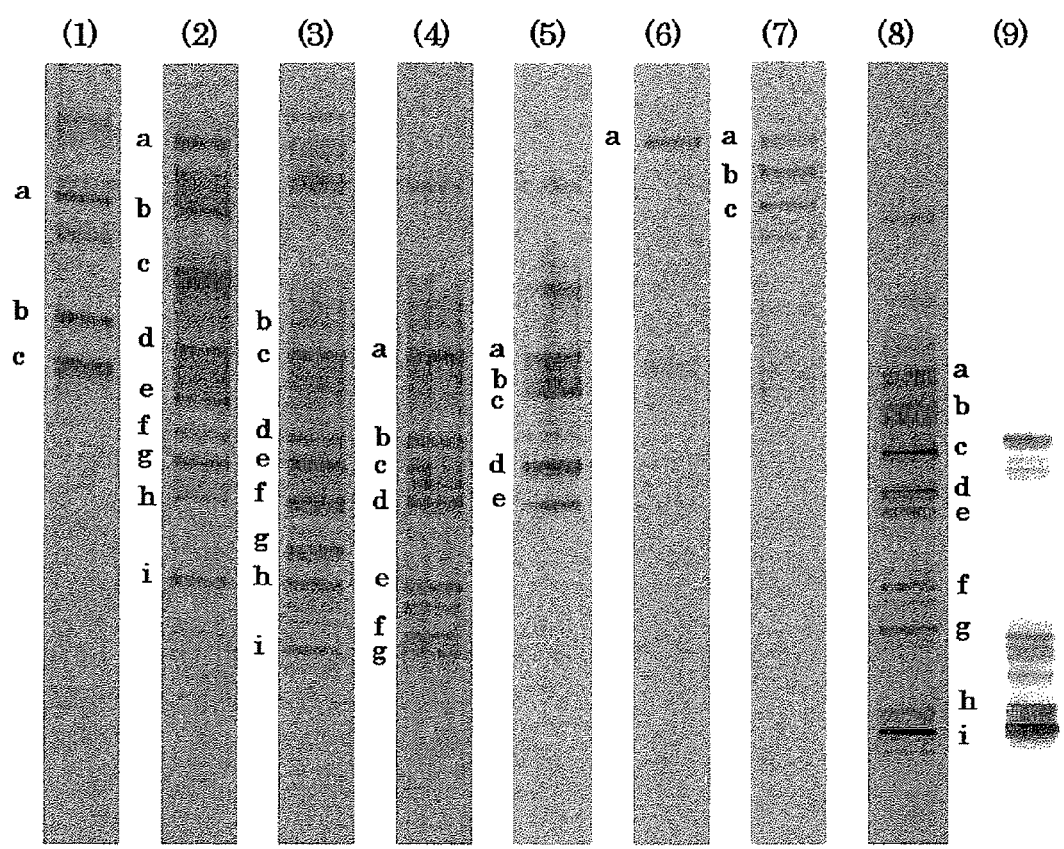
FIG. 2 is a photograph showing the results of electrophoresis of microorganisms by the DGGE method, during the composting treatment.

Known methods of DGGE and base analysis were used in this test. In short, 10% polyacrylamide gel, and urea (30 to 60% concentration gradient), as the denaturing agent, were used for the electrophoresis, which was carried out at 200 V for 3.5 hours. After the electrophoresis, the gel was stained with SYBER Green (from Takara Bio Inc.) and the bands that emitted light under UV (310 nm) irradiation were photographed with a CCD camera. Results of electrophoresis are shown in FIG. 2. The black and white parts of photograph showing the result of the electrophoresis have been reversed in FIG. 2 to make the positions of the bands more easily observable. PCR was carried out using the bands obtained as templates, and the base sequence of the PCR product decoded using an ABI PRISM 3100 DNA Sequencer (Applied Biosystems, Ca USA). Homology searches were carried out using BLAST to look, in an international base sequence database (GenBank/EMBL/DDBJ) for base sequences similar to the base sequence obtained.

In FIG. 2, (1) shows the results of electrophoresis of the livestock manure, (2) shows the results of electrophoresis at the second week from the start of the treatment in Comparative Example 1, (3) shows the results of electrophoresis at the third week from the start of the treatment in Comparative Example 1, (4) shows the results of electrophoresis at the sixth week from the start of the treatment in Comparative Example 1, (5) shows the results of electrophoresis of the seed bacteria for production of "return compost" (from Toyohashi Feed Mills Co., Ltd) used in Comparative Example 1, (6) shows the results of electrophoresis at the second week from the start of the treatment in Example 1, (7) shows the results of electrophoresis at the fourth week from the start of the treatment in Example 1, (8) shows the results of electrophoresis at the sixth week from the start of the treatment in Example 1, and (9) shows the results of electrophoresis of the seed bacteria (*Geobacillus thermodenitrificans*) used in Example 1. As a result of the homology search using BLAST, the bacterial strain from which each band was derived was assumed to belong to the microorganism species listed below.

(1-a): *Alcaligenes faecalis*,
(1-b): *Enterococcus* sp.,
(1-c): *Bacillus subtilis*,
(2-a): Unknown,
(2-b): *Alcaligenes faecalis*,
(2-c): *Cytophaga* sp.,
(2-d): *Nitrobacter* sp.,
(2-e): Uncultured bacterium,
(2-f): *Cytophaga* sp.,
(2-g): *Capnocytophaga*,
(2-h): *Glycomyces* sp.,
(2-i): *Bacteroides* sp,
(3-a): Unknown,
(3-b): *Knoellia sinensis*,
(3-c): *Nitrobacter* sp.,
(3-d): *Cytophaga* sp.,
(3-e): *Canocytophaga* sp.,
(3-f): *Glycomyces* sp.,
(3-g): Unknown,
(3-h): *Bacteroides* sp.,
(3-i): Unknown,
(4-a): *Nitrobacter* sp.,
(4-b): *Cytophaga* sp.,
(4-c): *Canocytophaga* sp.,
(4-d): *Glycomyces* sp.,
(4-e): *Bacteroides* sp.,
(4-f): Unknown,
(4-g): Unknown,
(5-a): *Nitrobacter* sp.,
(5-b): *Flavobactrium* sp.,
(5-c): *Canocytophaga* sp.,
(5-d): *Canocytophaga* sp., (5-e): *Glycomyces* sp.,
(6-a): *Bacillus thermocloaceae*,
(7-a): *Bacillus thermocloaceae*,
(7-b): *Bacillus* sp.,
(7-c): *Bacillus subtilis*,
(8-a): *Lactobacillus* sp.,
(8-b): *Thiomicrospira denitrificans*,
(8-c): *Glycomyces aeizonensis*,
(8-d): *Bacillus fortis*,
(8-e): *Bacillus niacini*,
(8-f): *Bacillus pumilus*,
(8-g): *Virgibacillus* sp.,
(8-h): *Sulfobacillus* sp.,
(8-i): *Geobacillus thermodenitrificans*.

Most of the bacteria (1-a to 1-c) detected in (1) of FIG. 2 are believed to have originated from the microbial material (P-Bio2, from P-Bio Fuji) added to the feed of the fattening cattle. These are ammonia oxidizing bacteria that are effective in deodorizing stables. However, these bacteria disappear from the livestock manure in the high temperature phase, where composting occurred in Example 1 and Comparative Example 1. In Comparative Example 1, *Nitrobacter* sp. (2-d), *Capnocytophaga* sp. (2-g), and *Glycomyces* sp. (2-h) originating from the seed bacteria became dominant as the composting advanced, increasing the temperature of the compost.

In Example 1, the compost temperature became higher than 70° C. from the second week from the start of the treatment. This made the microflora of the compost less varied, and only microorganisms that could withstand high temperature (*Bacillus*) multiplied selectively. In this respect the microflora of Example 1 was distinctly different from that of Comparative Example 1. *Geobacillus thermodenitrificans* was used as seed bacterium of Example 1, but it was detected that this bacterium did not multiply in the early stage of composting, and it multiplied only in the later stage, i.e., 4 weeks onwards. As shown in FIG. 2, in Example 1, extensive increase in the seed bacterium *Geobacillus thermodenitrificans* was seen at the sixth week from the start of the treatment, and it was observed that the seed bacterium had multiplied effectively during the treatment process.

<Concentration of Malodorous Gases>

Ammonia, amines, mercaptan, and hydrogen sulfide, produced from the compost piles of Example 1 and Comparative Example 1 were collected and their concentration was measured. To be more specific, a gas emission measuring chamber was installed on the compost and the gases produced were collected in a Tedlar bag. The concentrations of ammonia, amines, mercaptan, and hydrogen sulfide were measured with a gas detector tube (GV-100S, from Gastec Corporation). The results of the measurement are given in Table 1.

As shown in Table 1, the concentration of ammonia and amines at the sixth week from the start of treatment in Example 1 was far lesser (about ⅛) compared to the concentration of ammonia and amines at the sixth week from the start of treatment in Comparative Example 1. From the early stage of the reaction (from the first week from the start of the treatment), the concentration of each gas was much less in Example 1 than in Comparative Example 1. Mercaptan was detected at the high concentration of 8 ppm or more in Comparative Example 1, but it was not detected in Example 1. It became clear from these results that the malodorous components were markedly reduced from the early stage of the fermentation treatment in Example 1.

<Concentration of Greenhouse Gases>

In Example 1 and Comparative Example 1, the concentration of the greenhouse gases methane and nitrous oxide produced from the compost at the second, fourth, and sixth weeks from the start of the treatment was measured. To be more specific, a gas emission measuring chamber was installed on the compost and the gases produced were collected in a Tedlar bag. The methane gas concentration was measured with a gas chromatograph (GC-14A, Shimadzu corporation) and a column (Porapack Q-S 60/80 mesh 2.1 m×2.6 mm), and the concentration of nitrous oxide was measured with a gas chromatograph-mass analyzer (QP-5000, Shimadzu corporation) and a column (Pora Plot 27.5 m×0.32 mm). The results of these measurements are shown in Table 2.

TABLE 2

| | Compost at week 2 | | Compost at week 4 | | Compost at week 6 | |
|---|---|---|---|---|---|---|
| | Ex. 1 | Comp. Ex. 1 | Ex. 1 | Comp. Ex. 1 | Ex. 1 | Comp. Ex. 1 |
| Methane gas (v/v ppm) | <5 | 24.0 | <5 | 19.0 | <5 | 10.0 |
| Nitrous oxide (v/v ppm) | 12.0 | 59.0 | 1.2 | 12.0 | 0.3 | 2.8 |

As shown in Table 2, in the compost of Example 1, the concentration of nitrous oxide gradually became less in the course of the treatment, reaching 0.3 ppm, which is the same as its atmospheric concentration, at the sixth week from the start of the treatment. In the compost of Example 1, the methane gas concentration was less than the detection limit (5 ppm) from the second week onwards from the start of the treatment. In Comparative Example 1, 10 ppm of methane gas was detected even at the sixth week from the start of the treatment. The nitrous oxide concentration in Comparative Example 1 was almost 10-fold of that in Example 1. It became clear from the above results that the use of *Geobacillus thermodenitrificans* used in Example 1 for composting nitrogen-containing biomass markedly suppressed the production of methane gas and nitrous oxide, which are greenhouse gases.

<Maturity of Compost>

TABLE 1

| | | Before treatment | Day 4 | Week 1 | Week 2 | Week 3 | Week 4 | Week 5 | Week 6 |
|---|---|---|---|---|---|---|---|---|---|
| Ammonia (ppm) | Comp. Ex. 1 | 100 | 840 | 660 | 230 | 480 | 230 | 400 | 280 |
| | Ex. 1 | 3 | 100 | 20 | 0 | 6 | 25 | 3 | 14 |
| Amines (ppm) | Comp. Ex. 1 | 50 | 1000 | 540 | 360 | 720 | 360 | 450 | 900 |
| | Ex. 1 | 2 | 65 | 25 | 2 | 25 | 100 | 10 | 50 |
| Mercaptan (ppm) | Comp. Ex. 1 | 0 | >8 | >8 | >8 | >8 | >8 | >8 | >8 |
| | Ex. 1 | 0 | 0 | 0 | 0 | 0 | 0 | 0 | 0 |
| Hydrogen sulfide (ppm) | Comp. Ex. 1 | 0 | 0 | 0 | 0 | 0 | 0 | 0 | 0 |
| | Ex. 1 | 0 | 0 | 0 | 0 | 0 | 0 | 0 | 0 |

The maturity of the compost was expressed in terms of the degree of humification determined by a germination index method that measured the number of seeds germinated and the growth of the shoots. Safety is important when compost prepared by treating livestock manure is used for raising crops. Livestock manure contains harmful organic matter, weed seeds, etc. Therefore, to make the compost safe, its degree of humification needs to be improved. Degree of humification here means the extent to which the organic matter has been decomposed by the activities of microorganisms, etc, towards the level that does not have negative effects on the soil and crop environment, and also towards a condition suitable for crop growth. In other words, the point where the organic matter is decomposed to the aforesaid level and condition is the completion of humification (full maturity). The different stages of humification through which the organic matter is decomposed to the aforesaid level and condition represent the degree of humification. A condition suited for crop growth is achieved when, for instance, (1) the moisture content is reduced, the mucky feel and offensive odor are absent, and the handling property is improved, (2) harmful microorganisms, pathogens, and weed seeds are all dead, and (3) harmful organic components are decomposed and their harmful effects and gas damage are reduced.

The degree of humification can be determined by the formula given below using a germination index kit (SK System Seedling Cultivation Kit, from Quality Index Research Group, Fukuoka Research Center for Recycling Systems).

$$GI = G/Gc \times L/Lc \times 100 \ (\%)$$

In the above formula, GI is the germination index, G is the number of seeds that germinated in the extract of the compost, Gc is the number of seeds that germinated in distilled water, L is the shoot length in the compost extract, and Lc is the shoot length in distilled water.

The compost extract was obtained by adding 20 ml of boiling water to 0.6 g freeze-dried compost, shaking the mixture for 30 minutes, and then filtering the mixture. Fifteen Komatsuna seeds were grown for 4 days in each type of compost extract using the germination index kit, and the number of seeds germinated and the shoot length were measured.

The maturity of the compost was assessed using the criteria given below. In short, the compost was assessed as "immature" when the germination index (GI) was 69% or less, as "semi-mature" when it was 70 to 99%, and as "mature" when it was 100% or higher. The results of the evaluation are given in Table 3.

ment, and the germination index became 170 or more from the fourth week after the start of treatment. In the Comparative Example 1, the compost was only semi-mature even at the sixth week from the start of the treatment. It became clear from the above result that in the method of treatment of Comparative Example 1, a longer treatment than in Example 1 is required if nitrogen-containing biomass is to be used as compost.

<Analysis of Compost Components>

Among the components in the compost, the proportion of nitrogen (N), carbon (C), phosphate ($P_2O_5$), potassium oxide ($K_2O$), and chlorine (Cl) was measured, and the pH and electrical conductivity (EC) of the solution obtained by dissolving the compost in distilled water at the ratio of 1:10. These measurements were made by the Official Methods of Fertilizer Analysis (National Institute for Agro-Environmental Sciences, MAFF). The proportion of total nitrogen (N) was measured by Devarda's alloy-sulfuric acid method. The proportion of carbon (C) was measured by quantitative assay of organic carbon by dichromate oxidation. The proportion of phosphate ($P_2O_5$) was measured by the quinoline gravimetric method. The proportion of potassium oxide ($K_2O$) was measured by the sodium tetraphenyl borate gravimetric method. The proportion of chlorine (Cl) was measured by the silver nitrate method. The pH of the aforesaid solution was measured with a glass electrode. The EC of the aforesaid solution was measured with an electrical conductivity meter. The results of these measurements are given in Table 4.

TABLE 3

| 15 seeds sown | | No. germinated (after 4 days) | Germination percentage (after 4 days) | Mean shoot length (cm) | Germination index | Assessment |
|---|---|---|---|---|---|---|
| Distilled water | | 15 | 100% | 3.4 | — | — |
| Cattle feces before treatment | | 9 | 60% | 1.2 | 21.386 | Immature |
| Ex. 1 | Week 2 | 15 | 100% | 5.2 | 154.455 | Mature |
| | Week 4 | 15 | 100% | 6.0 | 179.208 | Mature |
| | Week 6 | 15 | 100% | 5.8 | 172.277 | Mature |
| Comp. Ex. 1 | Week 2 | 15 | 100% | 2.1 | 61.386 | Immature |
| | Week 4 | 15 | 100% | 2.7 | 81.188 | Semi-mature |
| | Week 6 | 14 | 93% | 3.4 | 94.719 | Semi-mature |

As shown in Table 3, in Example 1, the compost was already mature at the second week from the start of the treat-

TABLE 4

|  | Before treatment | Week 1 | Week 2 | Week 3 | Week 4 | Week 5 | Week 6 |
|---|---|---|---|---|---|---|---|
| Ex. 1 | | | | | | | |
| pH (1:10) | 8.22 | 8.02 | 8.03 | 8.07 | 8.00 | 8.04 | 7.75 |
| EC (1:10) mS/cm | 7.82 | 6.58 | 7.05 | 7.25 | 7.45 | 7.74 | 7.50 |
| Nitrogen (N) % | 1.27 | 1.01 | 1.00 | 1.09 | 1.15 | 1.15 | 1.18 |
| Carbon (C) % | 17.8 | 15.4 | 14.5 | 14.8 | 14.6 | 14.3 | 13.7 |
| Phosphate ($P_2O_5$) % | 1.75 | 1.32 | 1.47 | 1.56 | 1.55 | 1.53 | 1.64 |
| Potash ($K_2O$) % | 1.90 | 1.34 | 1.39 | 1.43 | 1.56 | 1.63 | 1.73 |
| Chlorine (Cl) ppm | 2280 | 2390 | 2610 | 2690 | 3800 | 3720 | 4940 |
| Moisture % | 49.8 | 48.5 | 58.7 | 52.2 | 49.3 | 50.8 | 39.0 |
| C/N ratio | 14.0 | 15.2 | 14.5 | 13.6 | 12.7 | 12.4 | 11.6 |
| Comp. Ex. 1 | | | | | | | |
| pH (1:10) | 8.22 | 7.95 | 8.03 | 8.11 | 8.35 | 8.50 | 8.64 |
| EC (1:10) mS/cm | 7.82 | 9.07 | 8.85 | 9.00 | 8.64 | 8.65 | 8.82 |
| Nitrogen (N) % | 1.27 | 1.38 | 1.50 | 1.38 | 1.62 | 1.71 | 1.59 |
| Carbon (C) % | 17.8 | 16.28 | 16.2 | 15.31 | 18.63 | 20.35 | 18.29 |
| Phosphate ($P_2O_5$) % | 1.75 | 2.28 | 2.61 | 2.66 | 3.12 | 3.37 | 3.19 |
| Potash ($K_2O$) % | 1.90 | 2.26 | 2.40 | 2.52 | 2.94 | 3.28 | 3.12 |
| Chlorine (Cl) ppm | 2280 | 3280 | 3240 | 2720 | 3550 | 4340 | 4150 |
| Moisture % | 49.8 | 56.2 | 56.6 | 55.8 | 55.2 | 53.6 | 50.0 |
| C/N ratio | 14.0 | 11.8 | 10.8 | 11.1 | 11.5 | 11.9 | 11.5 |

As shown in Table 4, the pH and EC of the compost, and its proportion of nitrogen showed a decreasing trend with time in Example 1. In contrast, in the Comparative Example 1, the pH, EC, and proportion of nitrogen showed an increasing trend with time.

<Compost-Mixed Water Decreasing Effect>

The composting treatment (6 weeks) was carried out in Examples 2 and 3, respectively using feces of fattening cattle and feces of dairy cattle as nitrogen-containing biomass, the rest of the conditions being as in Example 1. Commercially obtained compost that had been prepared from cattle feces from the Nasu farm, Japan, was used as nitrogen-containing biomass in Comparative Example 2. Commercially obtained compost that had been prepared from cattle feces from the Wada farm, Japan, was used as nitrogen-containing biomass in Comparative Example 3. Compost, a product of the Mitaka Co. Ltd., prepared from cattle feces was used as nitrogen-containing biomass in Comparative Example 4. One gram of each type of compost was suspended in 100 ml of purified water. The suspension was stirred vigorously and then left standing for 30 minutes. The supernatant was recovered and its absorbance measured at different wavelengths. The results of measurement are given in Table 5.

TABLE 5

|  |  | Ex. 2 | Ex. 3 | Comp. Ex. 2 | Comp. Ex. 3 | Comp. Ex. 4 |
|---|---|---|---|---|---|---|
| Wavelength | 400 nm | 0.091 | 0.132 | 0.234 | 0.528 | 0.735 |
|  | 500 nm | 0.028 | 0.042 | 0.081 | 0.175 | 0.242 |
|  | 600 nm | 0.011 | 0.021 | 0.037 | 0.07 | 0.094 |
|  | 700 nm | 0.003 | 0.006 | 0.016 | 0.028 | 0.036 |

As shown in Table 5, almost no absorption was seen in the wavelength range of 600 nm (orange) to 700 nm (red) in Examples 2 and 3. It became clear from this result that the compost treated with the *Geobacillus* microorganism in these Examples will have reduced runoff of compost-mixed water (compost leachate) caused by rain water, even when such compost is applied in the field. The compost prepared in the Comparative Examples using cattle feces showed higher absorbance than those prepared in the Examples at various wavelengths.

<Effect of Growth of Actinomycetes>

Feces of fattening cattle was used as nitrogen-containing biomass in Example 4, feces of dairy cattle was used as nitrogen-containing biomass in Example 5, and the composting (6 weeks) was done under the same conditions as in Example 1 except for adding a small amount of peat to the nitrogen-containing biomass in both these Examples. Commercially obtained compost that had been prepared from cattle feces from the Koga farm, Japan, was used as nitrogen-containing biomass in Comparative Example 5. 1 g sample of compost from each of Examples 4 and 5 and Comparative Examples 2 to 5 was weighed out into a 15 ml capacity sterilized Spitz tube, and 10 ml of peptone buffered saline containing 0.1% Tween 20 (Japanese Pharmacopoeia) was added to suspend the compost. Then, the suspension was stirred vigorously to elute the microorganisms present in the compost sample, and the bacterial count (CFU) per gram of dry matter was determined by a surface plate method. Ordinary agar medium was used for detecting aerobic bacteria, GAM agar medium was used for anaerobic bacteria, and HV agar medium was used for actinomycetes. Bacteria that multiplied at the culturing temperature of 30° C. were detected as mesophilic bacteria. Bacteria that multiplied at the culturing temperature of 65° C. were detected as thermophilic bacteria. The results are given in Table 6.

TABLE 6

|  |  | Ex. 4 | Ex. 5 | Comp. Ex. 2 | Comp. Ex. 3 | Comp. Ex. 4 | Comp. Ex. 5 |
|---|---|---|---|---|---|---|---|
| Aerobic bacteria | Mesophilic bacteria (cfu/g) | $6.59 \times 10^7$ | $5.1 \times 10^7$ | $2.39 \times 10^8$ | $2.59 \times 10^8$ | $2.09 \times 10^9$ | $4.46 \times 10^8$ |
|  | Thermophilic bacteria (cfu/g) | $2.86 \times 10^7$ | $9.08 \times 10^7$ | $4.81 \times 10^6$ | $2.66 \times 10^6$ | $5.22 \times 10^6$ | $1.59 \times 10^7$ |

TABLE 6-continued

|  |  | Ex. 4 | Ex. 5 | Comp. Ex. 2 | Comp. Ex. 3 | Comp. Ex. 4 | Comp. Ex. 5 |
|---|---|---|---|---|---|---|---|
| Anaerobic bacteria | Mesophilic bacteria (cfu/g) | $3.31 \times 10^4$ | $2.6 \times 10^4$ | $1.96 \times 10^7$ | $1.41 \times 10^7$ | $>5.8 \times 10^8$ | $6.85 \times 10^6$ |
|  | Thermophilic bacteria (cfu/g) | $5.51 \times 10^4$ | <40 | $<5.35 \times 10^4$ | $<5.15 \times 10^4$ | $1.97 \times 10^6$ | $3.62 \times 10^6$ |
| Actinomycetes | Mesophilic bacteria (cfu/g) | $3.3 \times 10^8$ | $4.2 \times 10^8$ | $7.49 \times 10^8$ | $5.15 \times 10^8$ | $2.32 \times 10^9$ | $4.32 \times 10^7$ |
|  | Thermophilic bacteria (cfu/g) | $4.14 \times 10^7$ | $6.7 \times 10^7$ | $6.42 \times 10^5$ | $7.9 \times 10^5$ | $<5.8 \times 10^5$ | $<7.24 \times 10^5$ |

As shown in Table 6, Examples 4 and 5 had a greater number of thermophilic actinomycetes (such as *Thermoactinomyces*) compared to Comparative Examples 2 to 5. Aerobic thermophilic bacteria were also present in larger numbers in the Examples than in Comparative Examples, but these had their origin from the seed bacteria. Thus, it became clear that composting treatment using the *Geobacillus* microorganism multiplied the actinomycetes, such as *Thermoactimyces*.

<Utilization of Nitrate>

Nitrate removal and total nitrogen removal by *Geobacillus* microorganisms were measured. *Geobacillus thermodenitrificans* (Accession No. NITE BP-157, nitrate reduction +, Denitrification +) was used in Example 6, and *Geobacillus stearothermophilus* (Accession No. ATCC7953, nitrate reduction +, denitrification −) was used in Comparative Example 6. Although the *Geobacillus stearothermophilus* (Accession No. ATCC7953) used in Comparative Example 6 does not have denitrification capability, some strains of *Geobacillus stearothermophilus* have denitrification capability. A medium comprising 10 g tryptone (Difco), 2 g potassium nitrate, and 1 L purified water (pH 7.5) was inoculated with different seed bacteria, and anaerobically cultured for 12 hours at 65° C. The nitrate concentration was then determined quantitatively by a calorimetric method (Roche, Cat. No. 1 746 081), and the total nitrogen analyzed by the Kjeldahl method. Nitrate removal and total nitrogen removal were determined by measuring the nitrate and nitrogen concentrations before and after the culturing. The results of measurement are given in Table 7.

TABLE 7

|  | Ex. 6 | Comp. Ex. 6 |
|---|---|---|
| Bacterial species | G. thermodenitrificans KS9 (Bacteria with denitrification capability) | G. stearothermophilus ATCC7953 (Bacteria without denitrification capability) |
| Nitrate removal (%) | 100 | 100 |
| Total nitrogen removal (%) | 15.3 | 1.2 |

As shown in Table 7, the nitrate removal was 100% and total nitrogen removal was 15.3% in Example 6. In the Comparative Example 6, the nitrate removal was 100%, but the total nitrogen removal was only 1.2%. *Geobacillus thermodenitrificans* can multiply under anaerobic conditions and in the presence of nitrate ions, and gain energy in the process. Therefore, it is assumed that the nitrate is reduced to nitrite (nitrate reduction capability) and the nitrite gets further decomposed to ammonia, nitrogen monoxide, nitrous oxide, and finally to nitrogen gas, which is released to the atmosphere. In short, it was discovered through the above method of evaluation that *Geobacillus thermodenitrificans* had denitrification capability. With *Geobacillus stearothermophilus*, the total nitrogen content did not decrease because it did not have denitrification capability, although it had nitrate reducing capability. It is thought that the nitrate taken up by the bacterial cell is converted into ammonia and used to synthesize amino acids like glutamic acid, glutamine, asparagine, etc.

<Treatment of Poultry Feces (Ammonia Nitrogen)>

The composting treatment was carried out using livestock feces (poultry feces) as nitrogen-containing biomass in Example 7 and Comparative Example 7. During this composting, the thermophilic bacterial count, decomposition of organic matter, and ammonia nitrogen content (per 100 g dry matter), in the nitrogen-containing biomass, and concentration of malodorous gases and concentration of greenhouse gases were measured periodically. The treatment was started by adding 10 $m^3$ of different seed bacteria to a total of 50 $m^3$ of layer hen manure and sawdust. In Example 7, *Geobacillus thermodenitrificans* (Accession No. NITE BP-157) was used as seed bacteria. In Comparative Example 7, seed bacteria for preparing the "return compost", mainly containing *Canocytophaga* sp. (Toyohashi Feed Mills Co., Ltd., see (5) of FIG. 2) were used as seed bacteria. Decomposition treatment was carried out in a primary fermentation tank for 3 days. After that, further decomposition treatment was carried out up to twenty-fourth day, in a lane type fermentation tank equipped with blowers.

The thermophilic bacterial count was obtained by the same method as in Example 1, by taking the counts of bacteria that multiplied on ordinary agar medium at the culturing temperature of 65° C. The concentration of malodorous gases, and the concentration of greenhouse gases were measured using a detection tube and gas chromatography, respectively, as in Example 1. The dryness of the organic matter was measured according to the method described in "Methods of Analyzing Organic Matter such as Compost", (Japan Soil Association, a Japanese corporation). The amount of organic matter was obtained from the oven-dry weight, compared with the pre-composting level, and the reduction of organic matter by composting was determined. The ammonia nitrogen concentration was measured by the indophenol blue method, according to the procedure described in "Methods of Analyzing Organic Matter such as Compost—II Methods of component analysis" (Japan Soil Association, a Japanese corporation). The results are given in Table 8.

TABLE 8

|  | Raw feces | Day 3 | Day 4 | Day 6 | Day 12 | Day 15 | Day 18 | Day 21 | Day 24 (Completion) |
|---|---|---|---|---|---|---|---|---|---|
| Ex. 7 | | | | | | | | | |
| Thermophilic bacterial count (65° C.) | ≦100 | $2.63 \times 10^7$ | $3.68 \times 10^6$ | $2.69 \times 10^6$ | $3.21 \times 10^6$ | $2.15 \times 10^6$ | $1.80 \times 10^6$ | $1.15 \times 10^5$ | $3.69 \times 10^5$ |
| Decomposition of organic matter | 0% | 29.80% | 35.24% | 43.85% | 45.60% | 46.80% | 48.32% | 52.10% | 54.62% |
| Ammonia nitrogen (mg/100 g dry matter) | 125.7 | 578.9 | 485.1 | 232.6 | 245.6 | 88.9 | 61.9 | 41.9 | 43.8 |
| Nitrous oxide gas | | 7 ppm | <2 ppm | <2 ppm | <2 ppm | <2 ppm | <2 ppm | <2 ppm | <2 ppm |
| Methane gas | | 58 ppm | <5 ppm | <5 ppm | <5 ppm | <5 ppm | <5 ppm | <5 ppm | <5 ppm |
| Ammonia gas | | 200 ppm | 60 ppm | 50 ppm | 70 ppm | 20 ppm | <10 ppm | <10 ppm | <10 ppm |
| Amine gas | | >200 ppm | >200 ppm | >200 ppm | >200 ppm | 75 ppm | 50 ppm | <25 ppm | <25 ppm |
| Comp. Ex. 7 | | | | | | | | | |
| Thermophilic bacterial count (65° C.) | ≦100 | ≦100 | ≦100 | ≦100 | ≦100 | ≦100 | ≦100 | ≦100 | ≦100 |
| Decomposition of organic matter | 0% | 12.70% | 22.42% | 22.50% | 29.90% | 30.03% | 27.68% | 33.98% | 33.98% |
| Ammonia nitrogen (mg/100 g dry matter) | 125.7 | 1991.34 | 865.8 | 410.1 | 275.4 | 302.1 | 324.6 | 354.3 | 366.9 |
| Nitrous oxide gas | | 20 ppm | <2 ppm | <2 ppm | <2 ppm | <2 ppm | <2 ppm | <2 ppm | <2 ppm |
| Methane gas | | 1572 ppm | <5 ppm | <5 ppm | <5 ppm | <5 ppm | <5 ppm | <5 ppm | <5 ppm |
| Ammonia gas | | 4000 ppm | 200 ppm | 200 ppm | 1500 ppm | 80 ppm | 90 ppm | 24 ppm | <10 ppm |
| Amine gas | | >200 ppm | >200 ppm | >200 ppm | >200 ppm | >200 ppm | >200 ppm | 100 ppm | 50 ppm |

As shown in Table 8, the ammonia concentration in poultry feces on the third day from the start of the treatment in Example 7 was reduced to about ¼ compared to the ammonia concentration in poultry feces on the third day from the start of the treatment in Comparative Example 7. In Example 7, on the fourth day from the start of the treatment and later also, the ammonia concentration was reduced to less than ½ of that in Comparative Example 7. It became clear from the above results that composting treatment using the *Geobacillus* microorganism also lowers the ammonia concentration in the compost.

Comparison of the results obtained in Example 7 and Comparative Example 7 revealed that Example 7 was superior to Comparative Example 7 with regard to promotion of the decomposition of organic matter and suppressive effect on the production of malodorous gases and greenhouse gases. Besides, the thermophilic bacterial count in Example 7 was higher than in Comparative Example 7.

The invention claimed is:

1. A method of treating biomass, comprising blending, with nitrogen-containing biomass, a microorganism of the genus *Geobacillus* having denitrification capability and a fermentation promoter that promotes fermentation of the nitrogen-containing biomass by the *Geobacillus* microorganism, wherein greenhouse gas production is suppressed.

2. The method of treating biomass according to claim 1, wherein the *Geobacillus* microorganism has an optimum temperature range for growth of 50 to 70° C.

3. The method of treating biomass according to claim 1, wherein the *Geobacillus* microorganism has an optimum pH range for growth of 6 to 8.

4. The method of treating biomass according to claim 1, wherein the *Geobacillus* microorganism having denitrification capability is *Geobacillus thermodenitrificans* deposited at the National Institute of Technology and Evaluation in Japan (an independent administrative institution), Patent Microorganisms Depositary, on Dec. 26, 2005 with accession number NITE BP-157.

5. The method of treating biomass according to claim 1, wherein the fermentation promoter is at least one selected from the group consisting of a polysaccharide hydrolase and an organic material.

6. The method of treating biomass according to claim 5, wherein the polysaccharide hydrolase is at least one selected from the group consisting of cellulase, xylanase, and pectinase.

7. The method of treating biomass according to claim 5, wherein the organic material is at least one selected from the group consisting of oil cake, rice bran, wheat bran, corn steep liquor, brown sugar, soybean oil cake, meat meal, dried blood, chicken meal, fish meal, dried bonito residue, pupae meal, spent yeast, and beer waste.

8. The method of treating biomass according to claim 1, wherein the nitrogen-containing biomass contains at least one selected from the group consisting of livestock manure and excess sewage sludge.

9. The method of treating biomass according to claim 1, wherein the blending includes supplying oxygen to the nitrogen-containing biomass by aeration once or more often before completion of the blending.

10. The method of treating biomass according to claim 1, wherein at the time of blending, peat is further added to the nitrogen-containing biomass.

11. A biomass treating agent for treating nitrogen-containing biomass, comprising a microorganism of the genus *Geobacillus* having denitrification capability and a fermentation promoter that promotes fermentation of the nitrogen-containing biomass by the *Geobacillus* microorganism.

* * * * *